May 6, 1941. R. POLK, SR., ET AL. 2,240,909
APPARATUS FOR SEPARATING INTEGUMENT-FREE SEGMENTS OF CITRUS FRUITS
Original Filed April 13, 1938
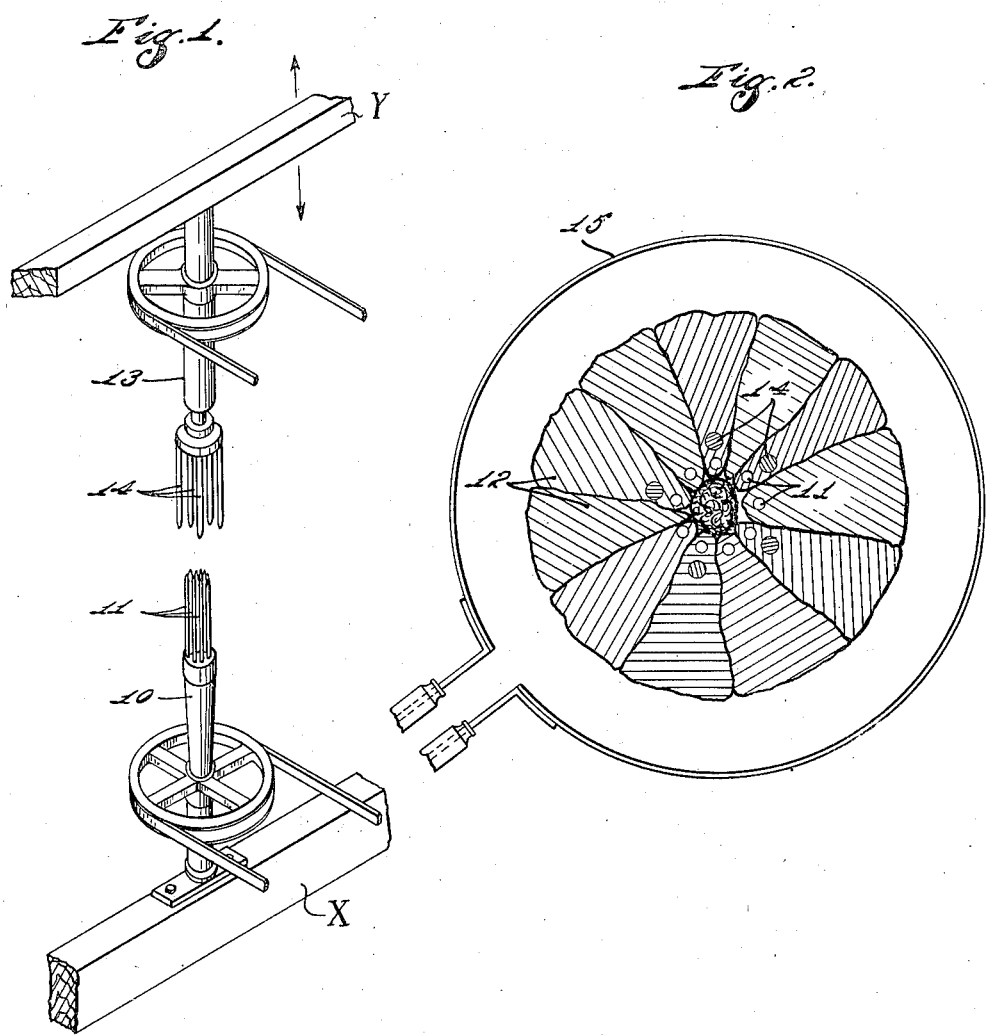
INVENTOR.
Ralph Polk Sr. and
Ralph Polk Jr.,
BY Hood & Hahn
ATTORNEY.

Patented May 6, 1941

2,240,909

UNITED STATES PATENT OFFICE 2,240,909

APPARATUS FOR SEPARATING INTEGUMENT-FREE SEGMENTS OF CITRUS FRUITS

Ralph Polk, Sr., Miami, and Ralph Polk, Jr., Haines City, Fla., assignors to The Polk Development Company, Tampa, Fla., a copartnership of Florida Original application April 13, 1938, Serial No. 201,732. Divided and this application June 29, 1939, Serial No. 281,858

3 Claims. (Cl. 146—3)

This application is a division from our application Serial No. 201,732, filed April 13, 1938, which has matured to Patent No. 2,199,345 granted April 30, 1940 and is directed to the subject matter illustrated in Figs. 1 and 2 of that application.

In order to can, or otherwise hermetically package, the edible portions of citrus fruits, it is desirable to extract from the fruit the segmented juice-cell groups substantially whole and free of the inedible radial integuments.

To that end, we have provided the mechanism forming the subject matter of this application.

The accompanying drawing illustrates our invention.

Fig. 1 is a perspective view of two co-acting circular series of tines adapted to be projected polarwise in opposite directions into a peeled citrus fruit; and Fig. 2 is a transverse section of a peeled citrus fruit into which the two sets of tines have been projected together with a plan of an enveloping guard to limit the outward movement of the segregated juice-cell groups.

In the drawing 10 indicates a rotary spindle, conveniently on a vertical axis, having at one end a series of comparatively small diameter tines 11 set in a circumferentially spaced circular series at a diameter such that the tines may be projected into the fruit parallel with the core to enter the juice-cell groups in the apices of the enclosing V-shaped integuments 12 as close as possible to, but within, the apices of said integuments. The number of tines 11 is conveniently somewhat less than, but nearly equal to, the average number of fruit segments. The head 10 is journalled on a suitable support X so as to be rotatable about the axis of its group of tines. The rotary spindle 13 is axially aligned with spindle 10 and at one end carries a series of tines 14 arranged in a circumferentially spaced circular series. The number of tines 14 may be less than the number of tines 11 and they are radially spaced from the axis of spindle 13 to lie outside the tines 11 but nevertheless quite close thereto so that when projected into the fruit, they will lie within the apices of the juice-cell groups and radially spaced outside of tines 11 by an amount slightly greater than the thickness of two adherent radial integuments 12. The spindle 13 is journalled upon a suitable support Y so as to be rotatable about the axis of its group of tines and the support Y is shiftable axially of said group of tines, as indicated by the arrows.

The fruit having been penetrated by the tines 11 and being supported thereon, is preferably acted upon by a suitable tool, such as a knife, to break the bonds between one face of a plurality of juice-cell groups and the adherent radial integuments.

Thereupon the series of tines 14 is projected into the fruit and one set of tines is rotated relative to the other set in the direction to cause the tines 14 to engage the integuments which have not been separated from their juice-cell groups so that further relative rotation of the two sets of tines operates to crowd the tines 14 along the bonded faces of those integuments and thus free the juice-cell groups therefrom.

The action appears to be a tensioning of the bonded integument causing it to slip from the juice-cell group by relative movement substantially in the bonding plane.

For instance, suppose that, in Fig. 2, the tines 14 be rotated counter-clockwise and that the natural bonds, clockwise behind the tines 14, have been previously ruptured by the knife action previously described; the entire group of integuments is held against rotation by tines 11; the tines 14 crowd against the still bonded integuments and wrap them counter-clockwise around the group 11 and therefore, in effect, travel outwardly along the bonded faces of the integuments and pushing against the juice-cell groups, shove said groups in such manner as to slip them from the bonded integuments.

The operation is a very effective one resulting in a large proportion of substantially-whole, integument-free, juice-cell segments ready to be packed in containers.

The tine-group 14 may be dispensed with. After preliminary separation of one integument from each juice-cell group, the tine group 11 may be rotated at high speed, whereupon the juice-cell groups will be thrown centrifugally from the integuments which will be retained as a group on tine 11. In this operation, it is desirable to limit the outward movement of the freed juice-cell groups by an enveloping guard 15.

We have, at times, obtained satisfactory results when using only one or two tines 14 in conjunction with the tine-group 11 but a slightly larger number of tines 14, though less than the number of tines 11, is probably desirable.

We claim as our invention:

1. Means for manipulating citrus fruits comprising a circular series of parallel tines projectable into the fruit between the radial integuments thereof within and adjacent the apices of said integuments, a finger parallel with said tines and axially projectable into the fruit closely beyond the circumference of said circular series of tines, a support for said tines, and a support for said finger, the supports being of such character that one may be shifted axially of the tines and finger so that the tines and finger may be concurrently embedded in the fruit with the finger in an orbit of larger diameter than the tines and that one may be rotated to cause relative revolution between tines and finger about a common axis and the tines and finger being of such lengths that upon such relative revolution the radial integuments will be wrapped around the tines series between said tines and finger.

2. Apparatus for acting on citrus fruit comprising, a head provided with a circular series of small tines of a length greater than half a fruit diameter and arranged in a circular series circumferentially spaced and radially spaced from the axis of the group by an amount such that the tines, when projected polarwise into a fruit, will lie within apices of the V-shaped integuments of the fruit, and a second head carrying one or more tines projecting from said second head parallel with the tines of the first head and so spaced as to be nestable over the first-mentioned series of tines parallel therewith and radially beyond the tines of the first-mentioned series by an amount slightly greater than the combined thickness of two bonded radial integuments of a fruit, one of said heads being rotatable about the axis of the first-mentioned circular series of tines while the tines of the second head encompass the tines of the first head.

3. Apparatus for segmenting citrus fruits comprising, a plurality of relatively small parallel tines arranged in a circular series circumferentially spaced and radially distanced so as to be projectable between radial integuments of the fruit closely within fruit segment apices, a second circular series of parallel tines coaxial with the first series and closely nestable thereabout, and a support for one series whereby said series may be rotated relative to the other after fruit penetration by both series.

RALPH POLK, Sr.
RALPH POLK, Jr.